June 21, 1932. S. MADSEN 1,863,908
AUTOMATIC GLUING AND ASSEMBLING MACHINE
Filed Feb. 11, 1931 13 Sheets-Sheet 6
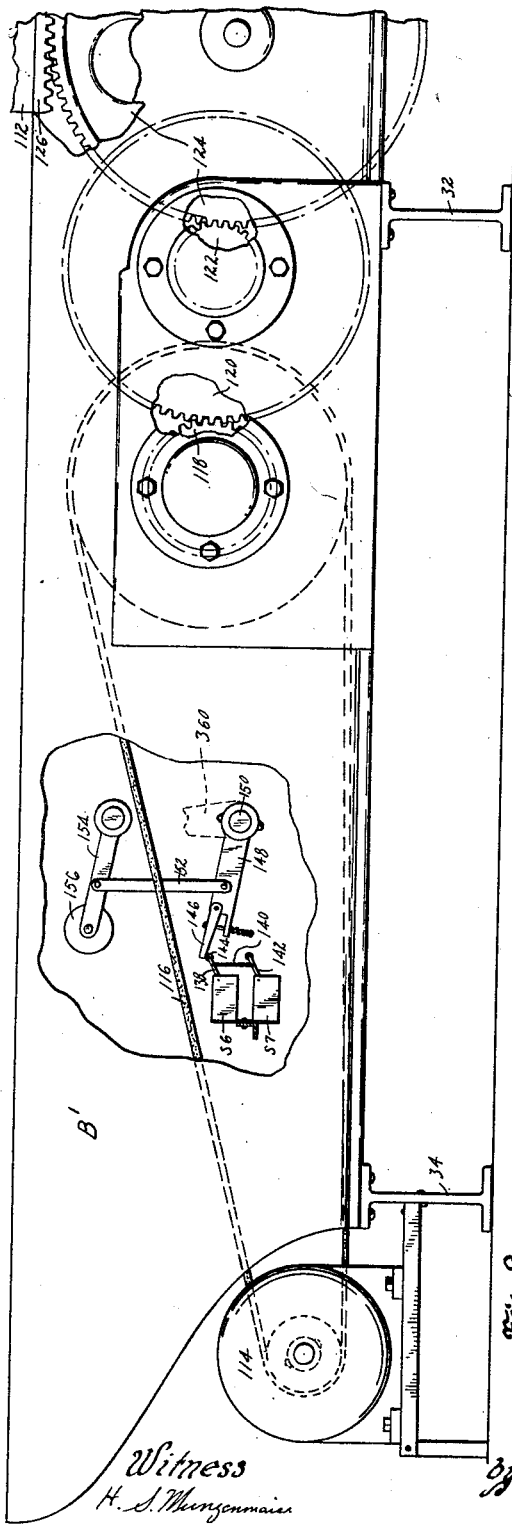
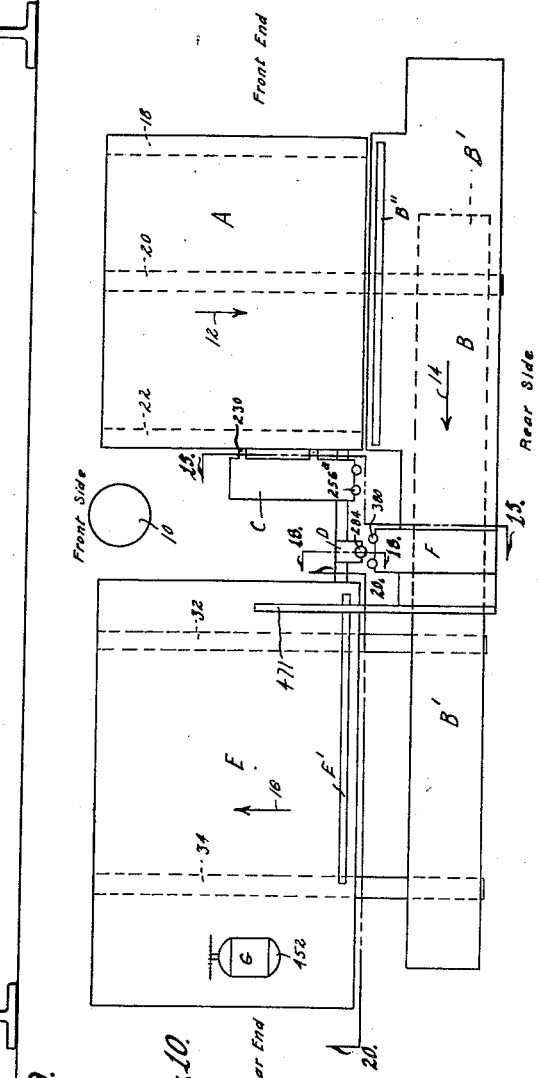
Inventor
~Sern Madsen~
by Bair, Freeman & Sinclair
Attorneys

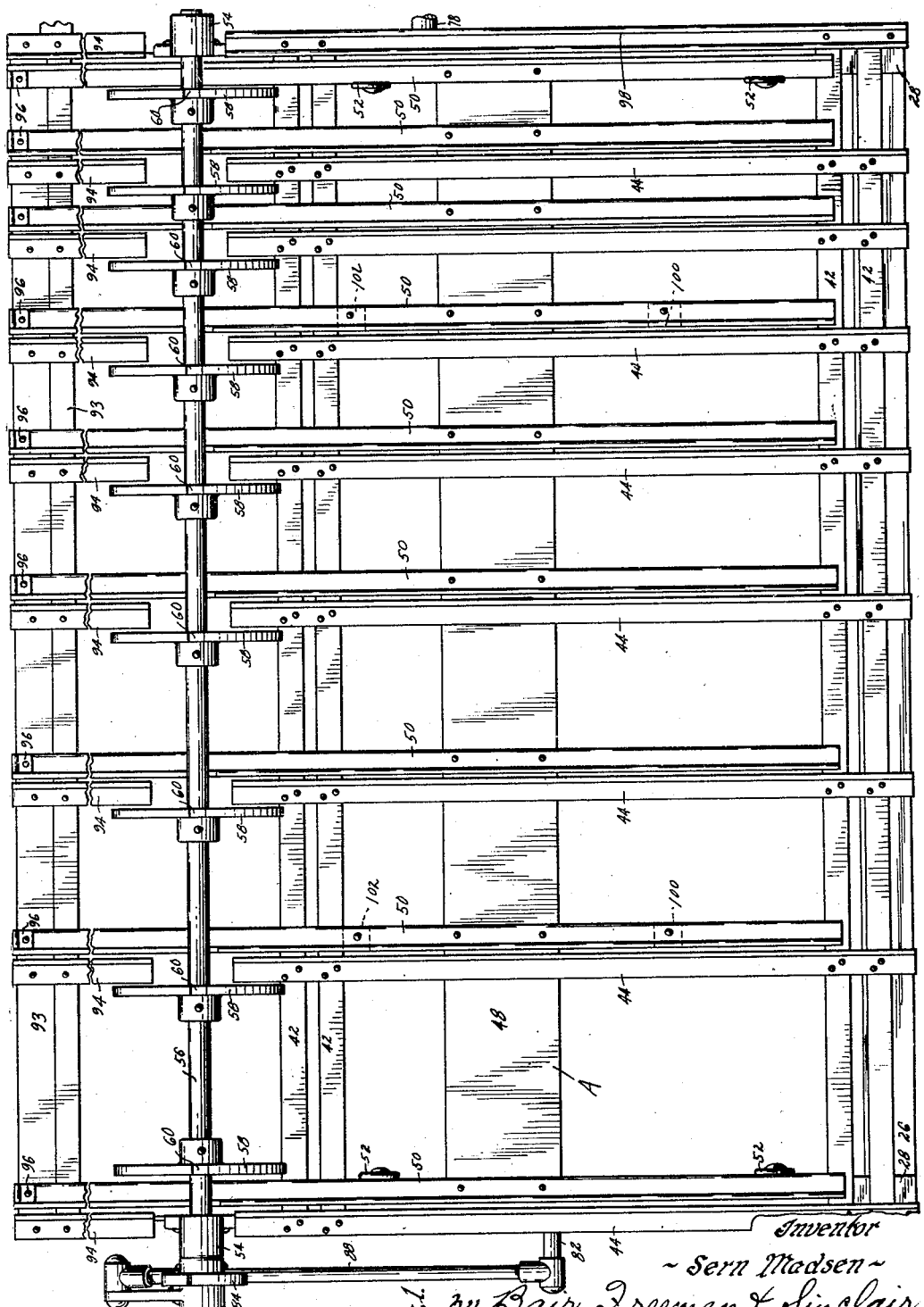

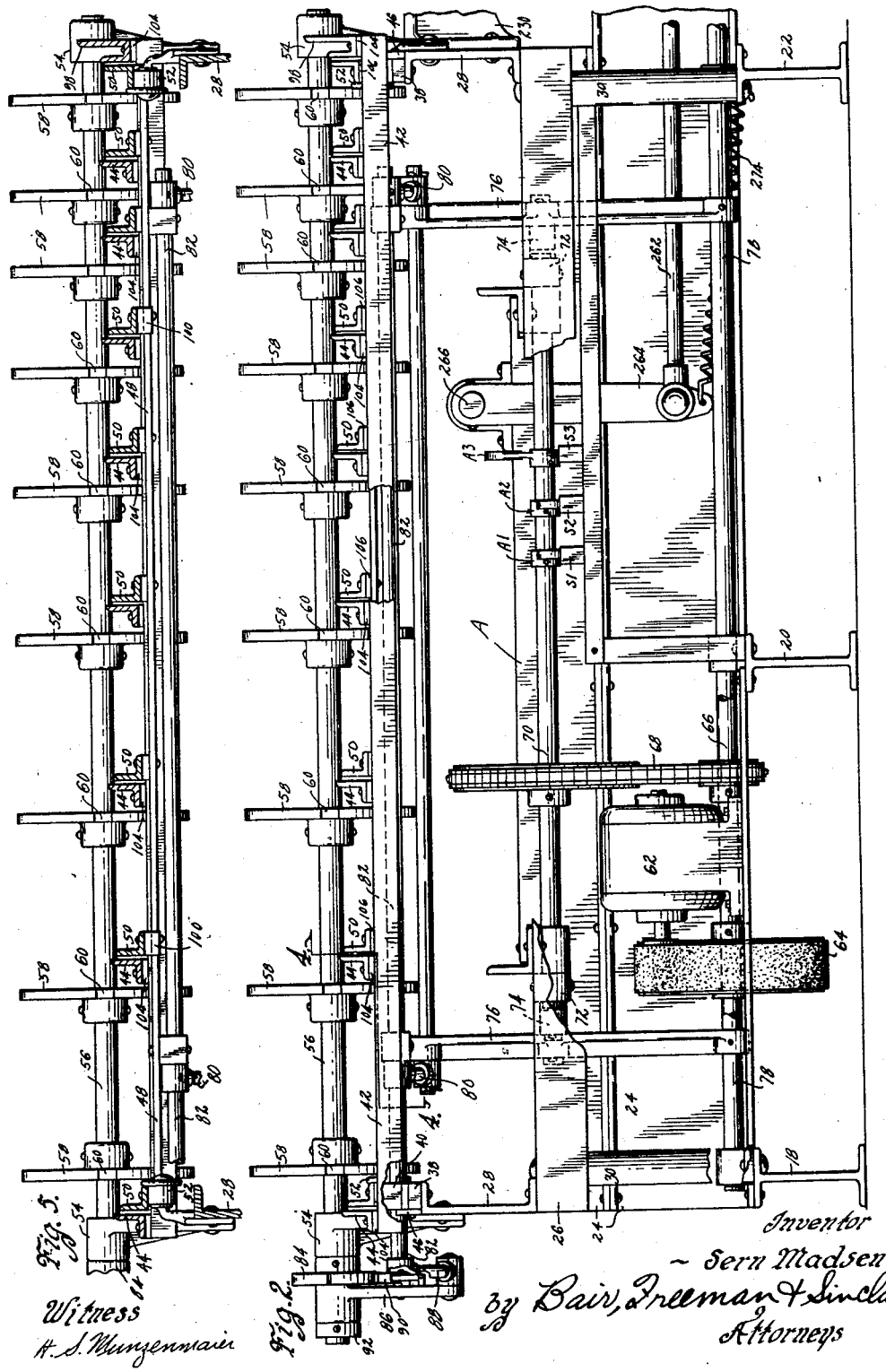

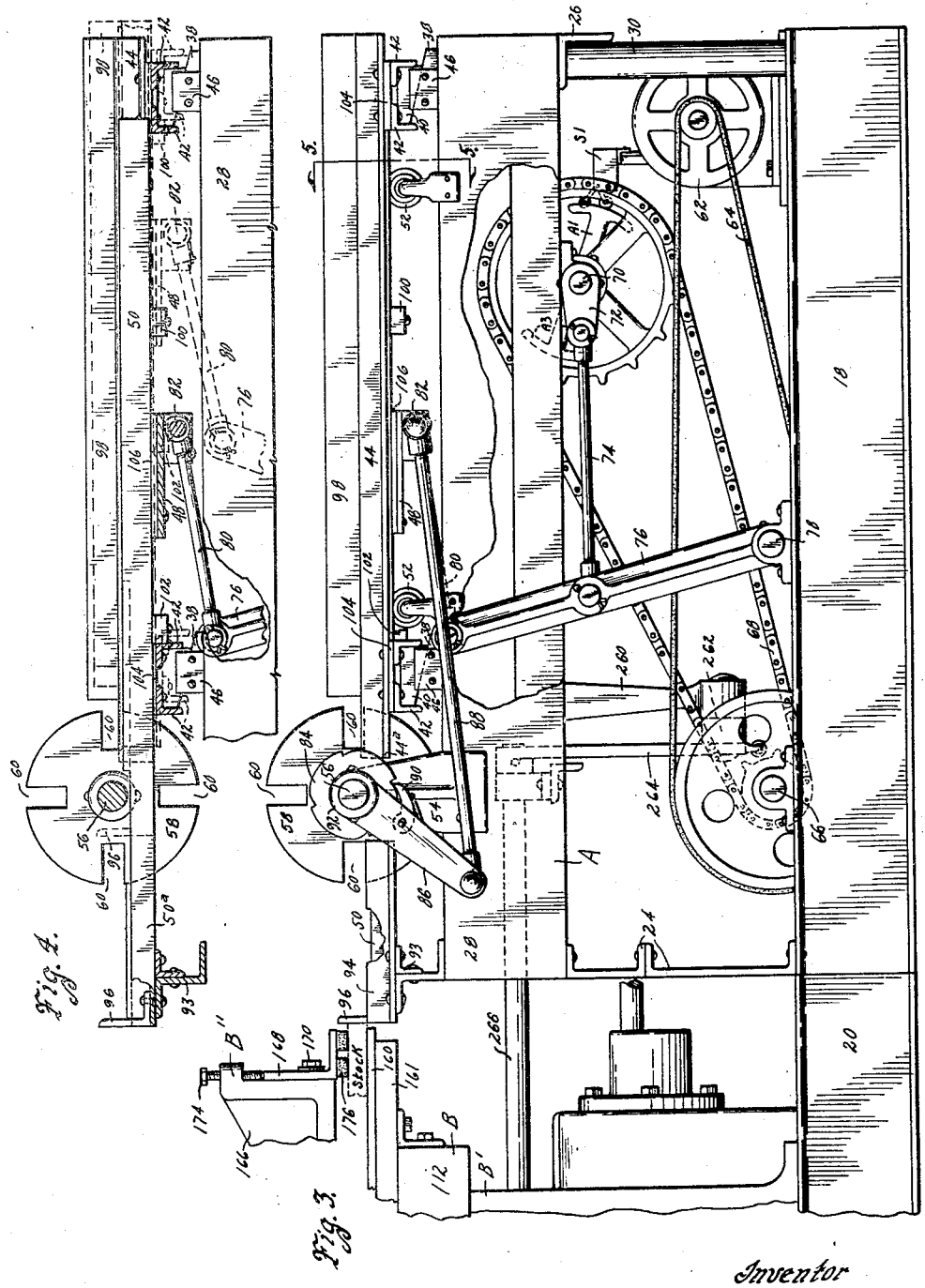

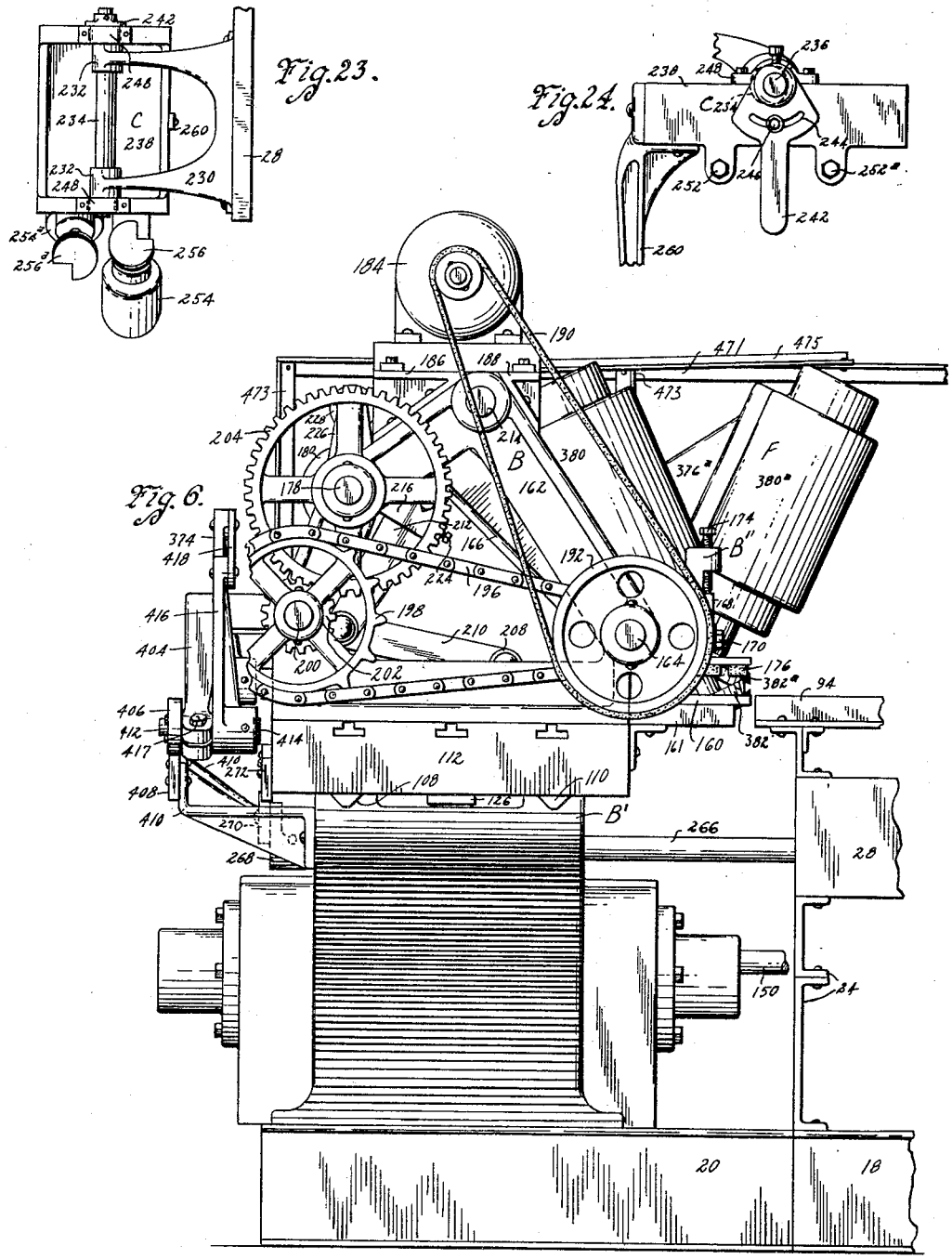

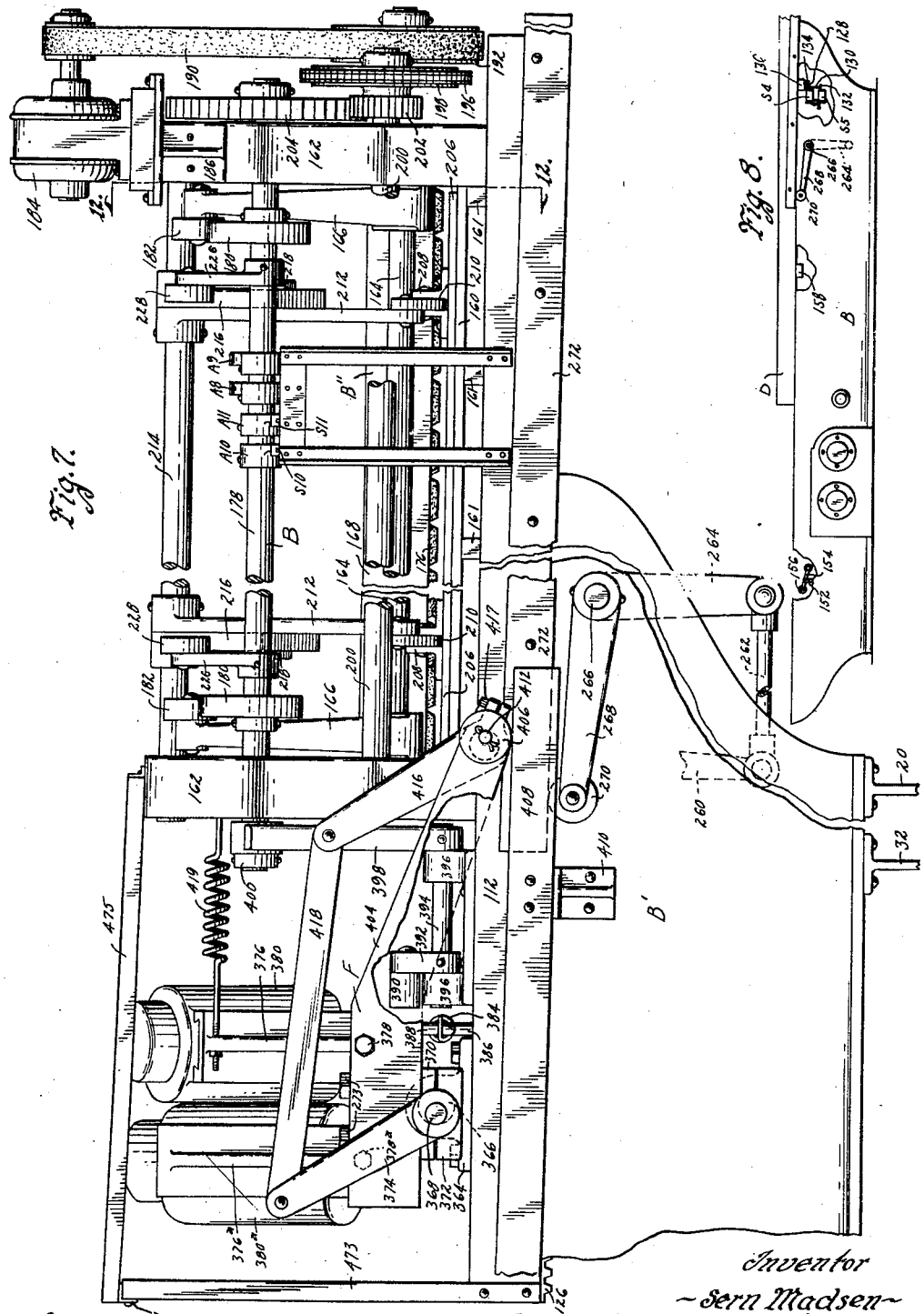

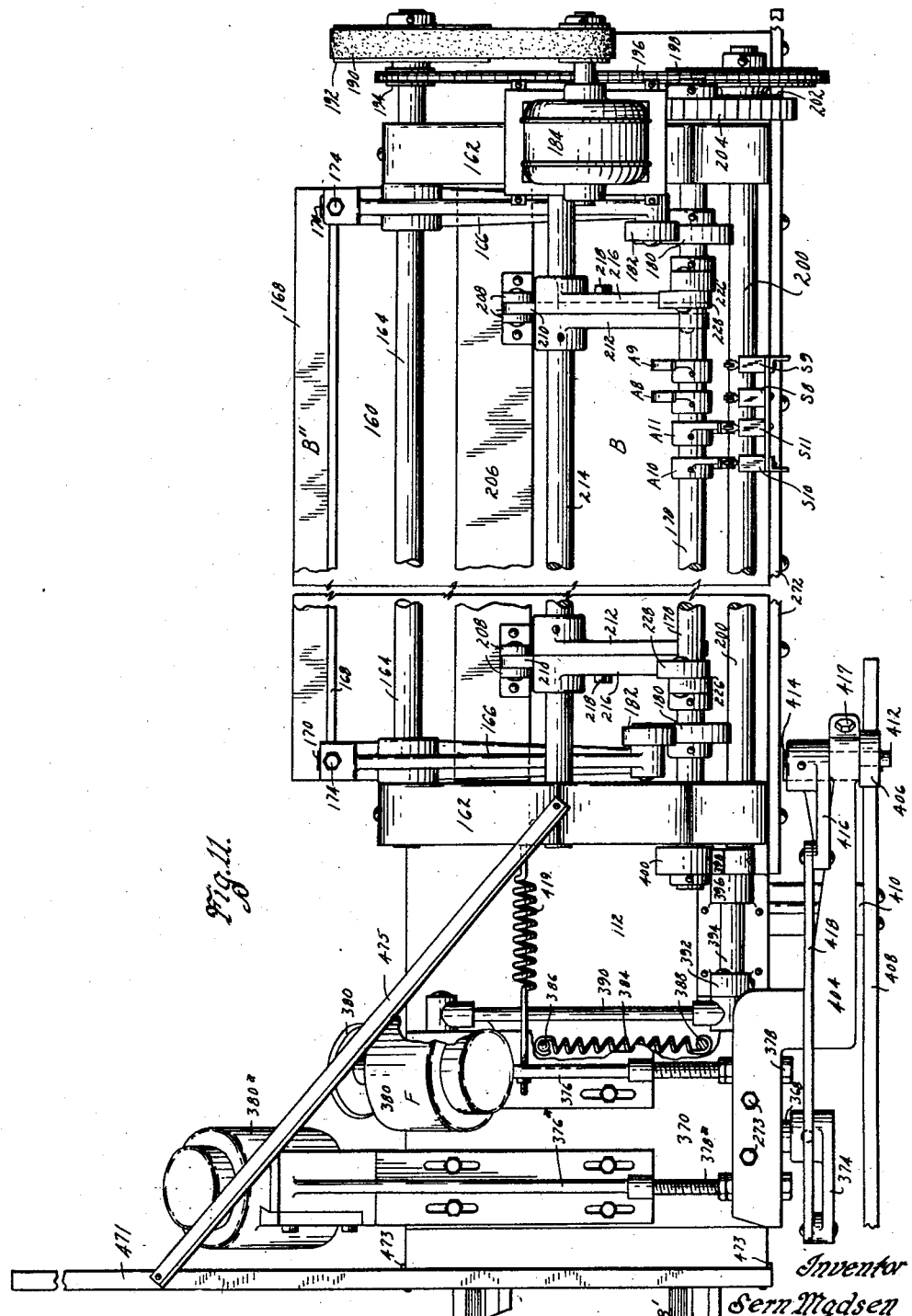

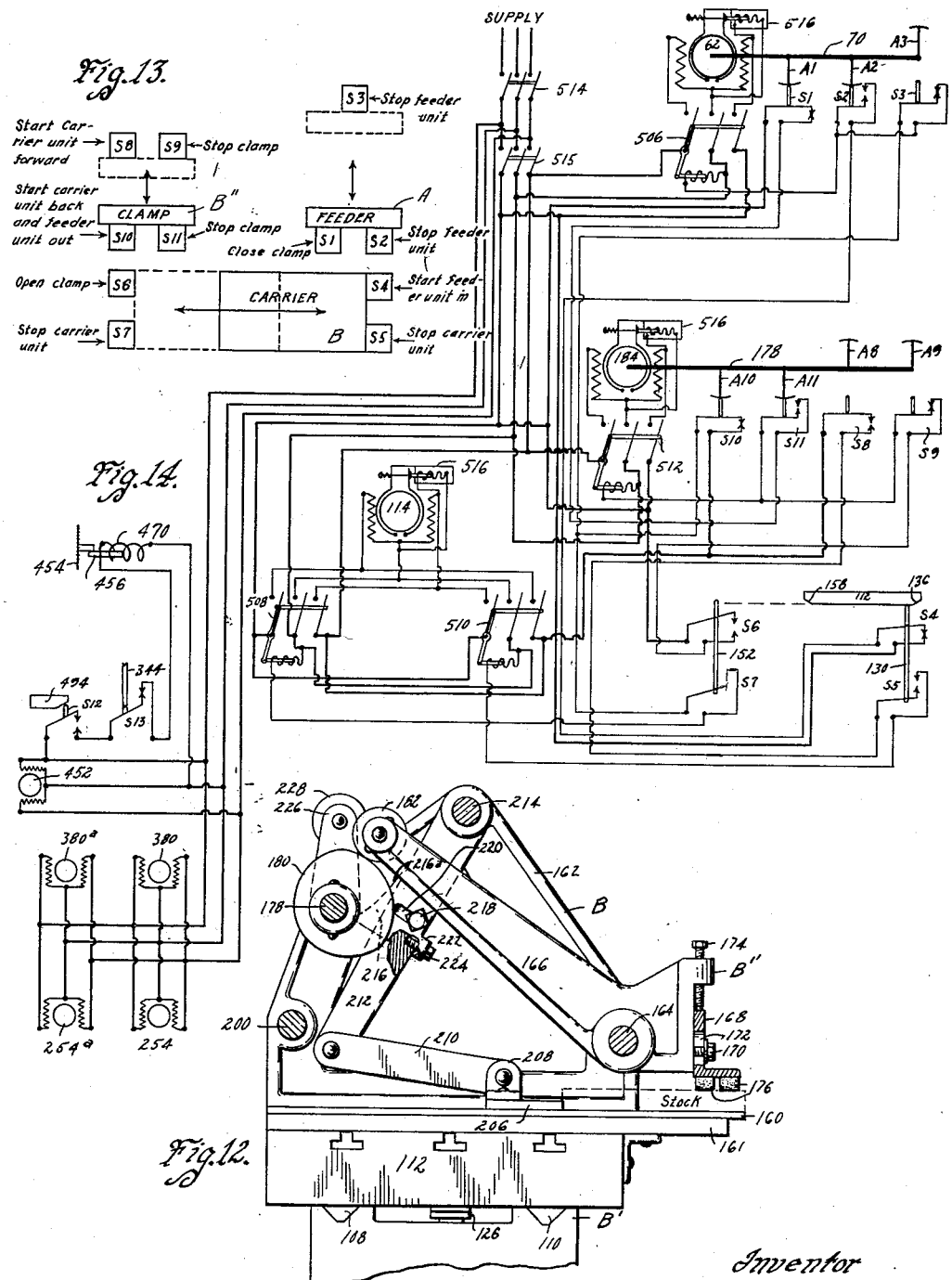

June 21, 1932.   S. MADSEN   1,863,908
AUTOMATIC GLUING AND ASSEMBLING MACHINE
Filed Feb. 11, 1931   13 Sheets-Sheet 9
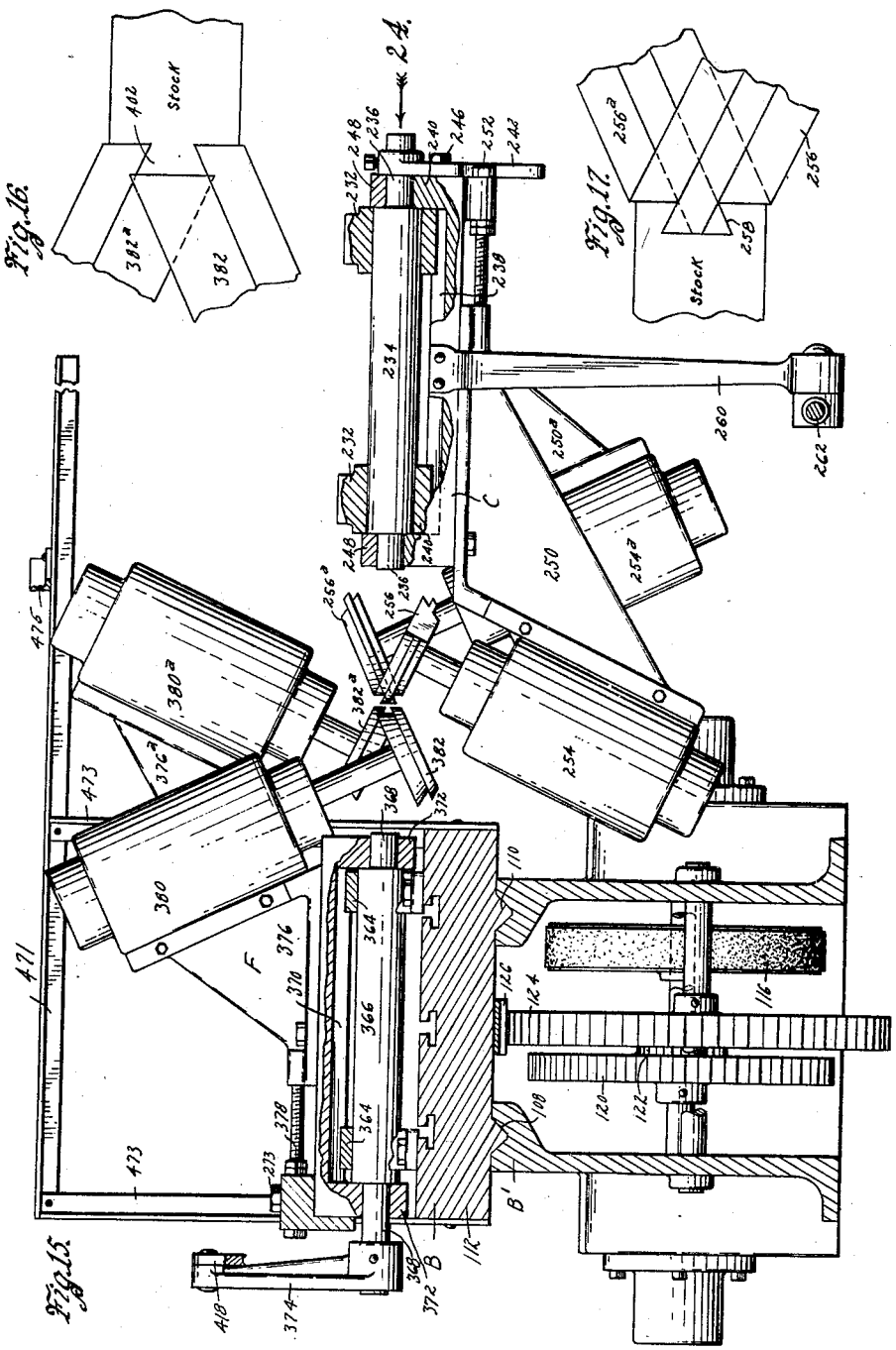

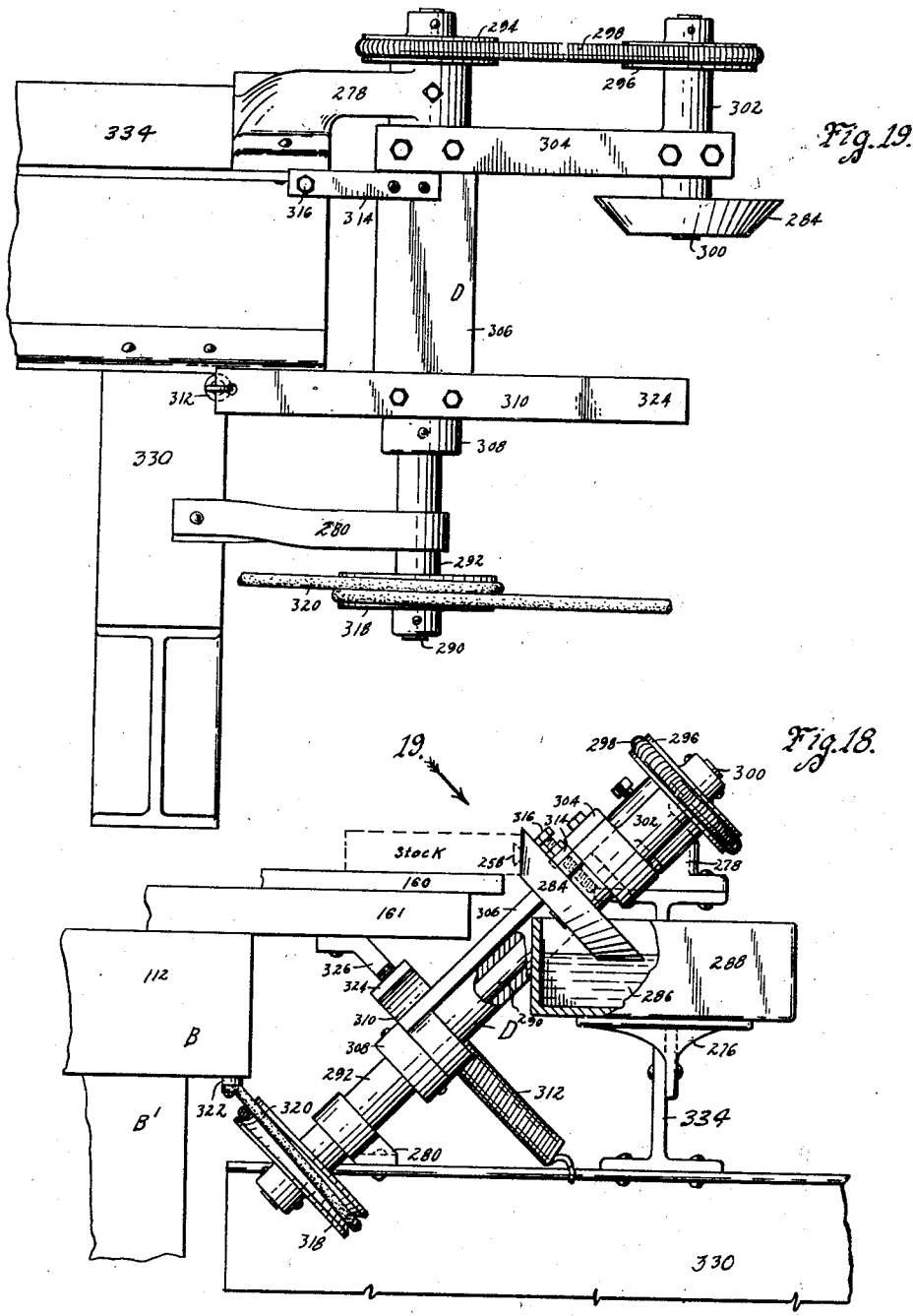

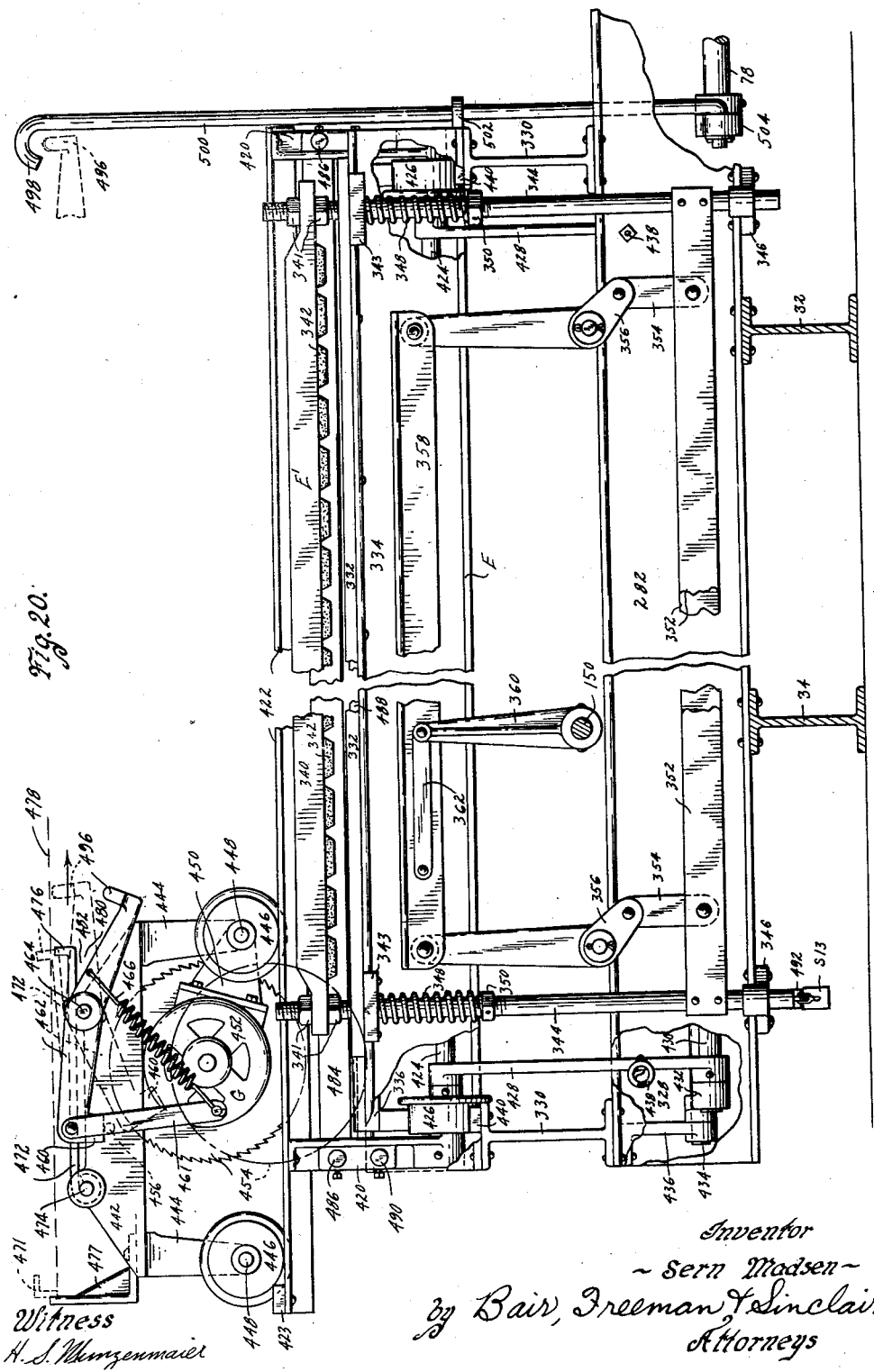

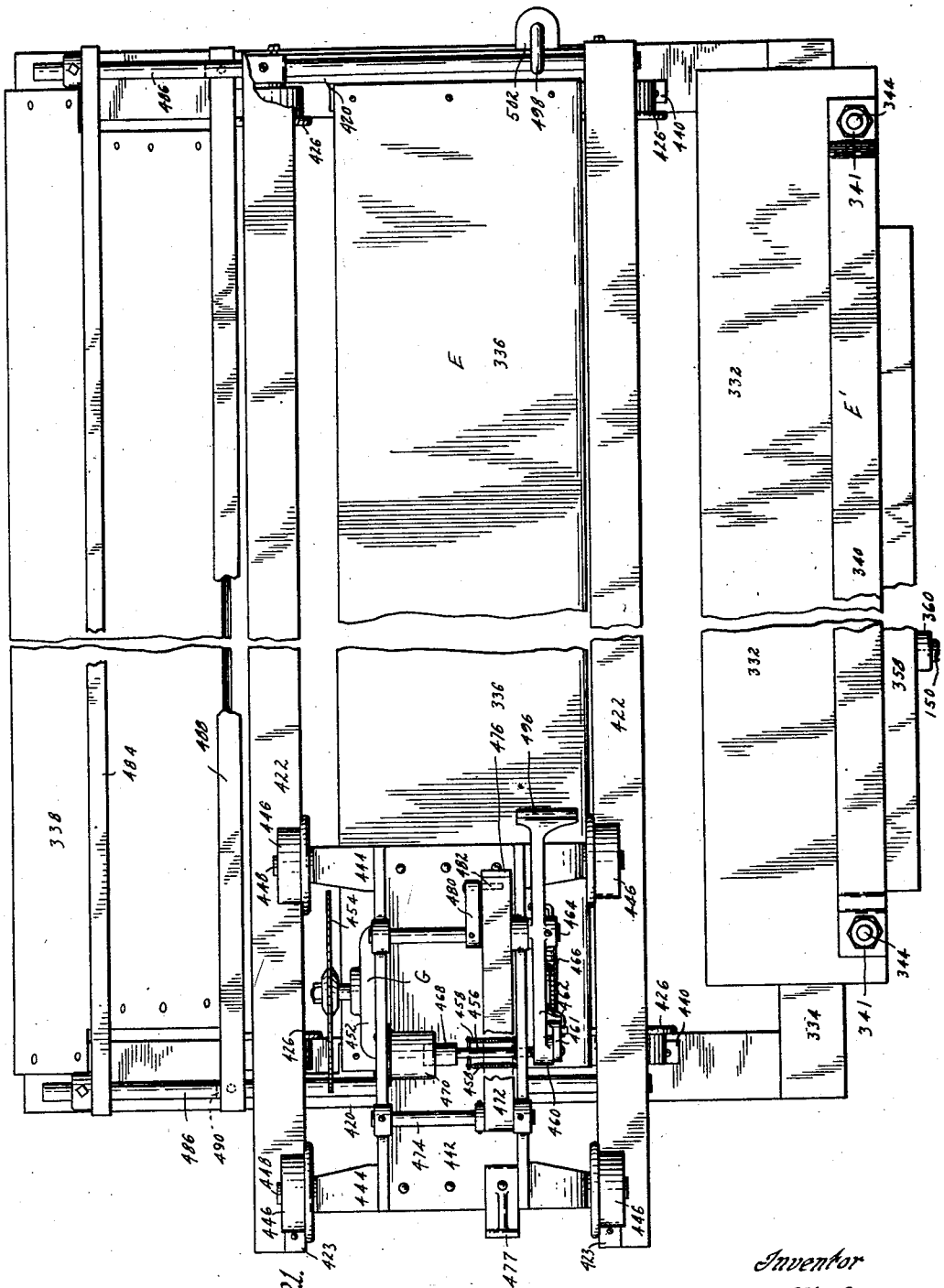

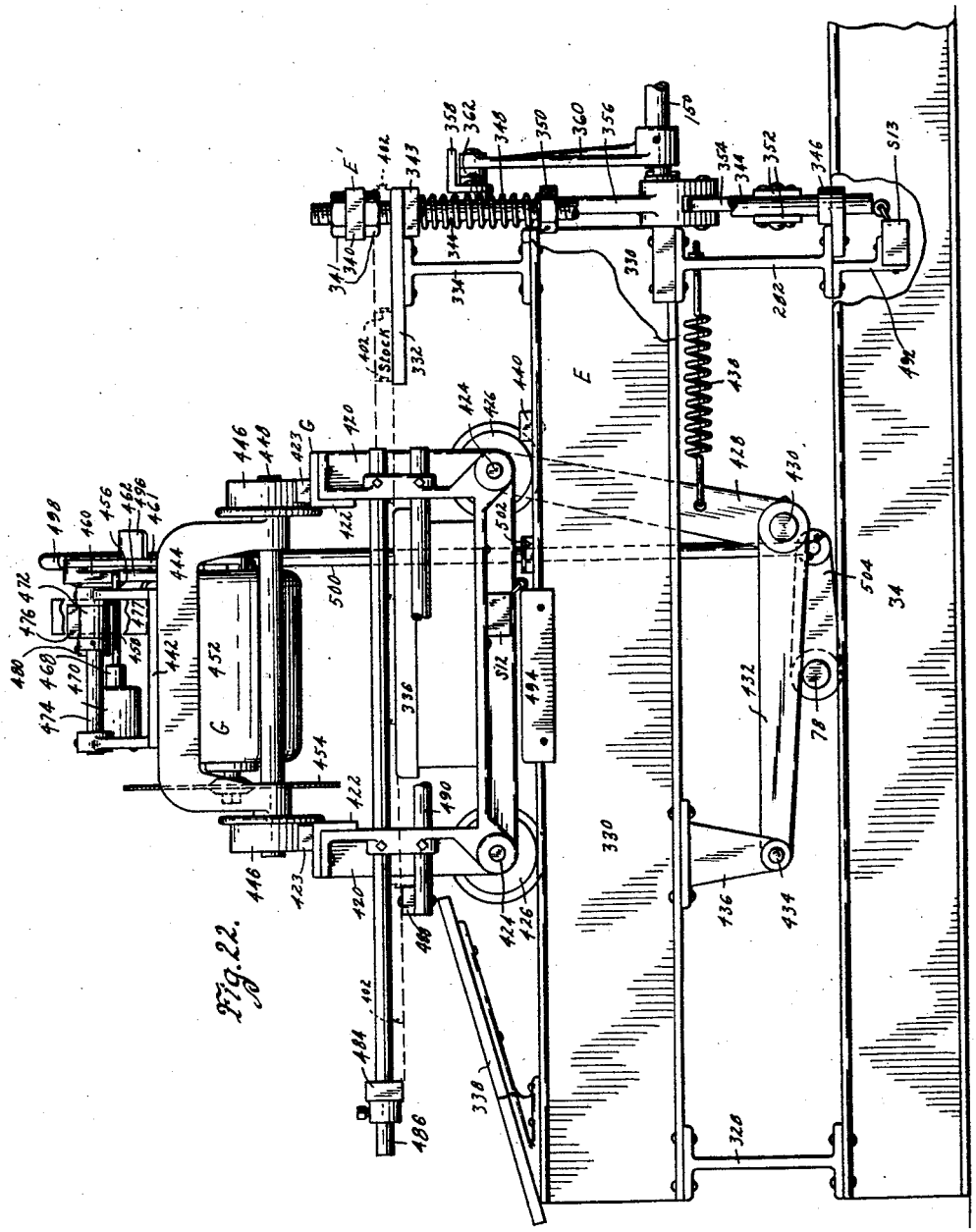

Patented June 21, 1932

1,863,908

UNITED STATES PATENT OFFICE

SERN MADSEN, OF CLINTON, IOWA, ASSIGNOR TO CURTIS COMPANIES, INCORPORATED, OF CLINTON, IOWA, A CORPORATION OF IOWA

AUTOMATIC GLUING AND ASSEMBLING MACHINE

Application filed February 11, 1931. Serial No. 515,026.

The object of my invention is to provide a machine for automatically gluing and assembling boards edge to edge in one continuous ribbon and to cut from this ribbon successive boards of predetermined width.

A further object is to provide a machine of simple, durable and comparatively inexpensive construction comprising a plurality of units for operating upon boards fed to the machine, each unit attaining objects contemplated as follows:

A. One object of the machine is to provide a feeder unit that will handle stock of various widths and lengths, that permits matching of the grain on adjoining boards in the exact relation they will assume after being glued together and which makes the matched side the face side of the assembled boards.

B. A further object is to provide a carrier unit with clamping means thereon which receives a board from the feeder, clamps it securely in aligned position and passes it past a stationary cutter unit for dovetailing the edge thereof and then discharges it upon an assembling table.

C. Another object is to provide a dovetailing cutter unit stationarily mounted for dovetailing the edge of the board, as the board is being carried by the carrier unit and past the stationary cutter unit.

D. A further object is to provide a means for applying glue to the dovetailed edge cut by the stationary cutter unit.

E. A further object is to provide an assembly table having a holding clamp thereon to receive the board from the carrier unit and hold it while the uncut edge thereof is being dovetailed by a movable cutter unit, which is carried by the carrier unit and past the table.

F. Still another object is to provide a movable cutter unit mounted on the carrier unit and carried thereby for dovetailing the second edge of the first board held in the clamping means on the assembly table, this operation occurring as the carrier returns to starting position.

A further object is to thread the dovetailed edge of a second board onto the dovetailed edge of the first board immediately after the edge of the second board is dovetailed by the stationary cutter unit, the threading operation being performed by the movement of the carrier having the second board clamped thereon, the first one being clamped on the assembly table.

Another object is to dovetail the edges of the successive boards on a slight taper, so that as they are assembled together by threading the edge of one over the edge of another one, the dovetailed tongue and groove formed by the dovetailed cutters will be tightened so as to eliminate the necessity of providing gluing clamps for holding the assembled boards together edge to edge.

G. Still a further object is to provide an automatically operated rip saw unit supported on the assembly table and mounted on and carried by a suitable longitudinally and sidewise shiftable carriage for cutting portions of predetermined width from the ribbon of boards being assembled and projected outwardly upon the assembly table.

Still another object is to design a machine as nearly automatic as possible for gluing and assembling boards, whereby one man can conveniently operate it by both feeding boards to the feeder unit and removing them from the assembly table, after they have been ripped to width by the rip saw unit.

A further object is to provide sources of power, such as electric motors, for operating the feeder unit, the carrier unit, the stationary cutter unit, the movable cutter unit and the rip saw unit as well as the clamping means on the carrier unit and the assembly table and the gluing unit and proper electrical, magnetic and mechanical means whereby the completed operation of any one unit will stop its own motor and successively start the operation of the motor of one or more of the other units, such successive stopping and starting of units being entirely automatic and progressive through a complete cycle of operation of all the units, the cycles being repeated indefinitely.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a plan view of the feeder unit.

Figure 2 is a front elevation of the feeder unit, parts being broken away to show details of construction.

Figure 3 is a front end elevation of the feeder unit showing a portion of the front end of the carrier unit thereadjacent.

Figure 4 is a sectional view on the line 4—4 of Figure 2 illustrating board advancing and board reversing means of the feeder unit.

Figure 5 is a sectional view on the line 5—5 of Figure 3 showing details of construction of the board advancing means on the feeder unit.

Figure 6 is a front end elevation of the carrier unit, showing a portion of the feeder unit thereadjacent.

Figure 7 is a rear elevation of the forward end of the feeder unit, showing the clamping mechanism and the movable cutter unit thereon, parts being broken away.

Figure 8 is a similar elevation on a reduced scale of the entire rear side of the carrier unit showing the operative connection of the platen on the carrier unit with control switches, etc. in proper relative positions.

Figure 9 is a rear elevation of the rear end of the carrier unit and is a continuation of Figure 8.

Figure 10 is a diagrammatic plan view of the entire machine, showing the various units in their relative positions.

Figure 11 is a plan view of the carrier unit showing a cutter unit mounted thereon, parts being broken away.

Figure 12 is a vertical detailed sectional view on the line 12—12 of Figure 7 showing board clamping means.

Figure 13 is a diagrammatic view illustrating the movement of parts of the various units and showing in graphic form how the completion of an operation of one unit operates to start an operation of another unit.

Figure 14 is an electrical diagram of the motors, control switches, etc. in the electrical system of the machine.

Figure 15 is a vertical detail sectional view on the line 15—15 of Figure 10 showing the stationary and movable cutters.

Figure 16 is a diagrammatic view showing the cutters for the dovetailed tongue.

Figure 17 is a diagrammatic view showing the cutters for the dovetailed groove.

Figure 18 is a vertical sectional view on the line 18—18 of Figure 10 illustrating the gluing unit of the machine.

Figure 19 is an angular plan view of the gluing unit being viewed in the direction of the arrow 19 adjacent Figure 18.

Figure 20 is a rear elevation of the assembly table and associated parts, as taken on the line 20—20 of Figure 10.

Figure 21 is a plan view of the assembly table and associated parts as viewed from the rear end of the machine.

Figure 22 is a rear end elevation of the assembly table and the assembly clamp and the rip saw unit mounted thereon.

Figure 23 (on Sheet 4) is a plan view of the stationary cutter unit as viewed from the rear side of the machine.

Figure 24 is a front end elevation of part of the stationary cutter unit as viewed in the direction of the arrow 24 adjacent Figure 15.

*General description of the machine*

My automatic gluing and assembling machine can perhaps be best described by first referring to Figure 10 in which I will point out the units as referred to in the objects of my invention which bear reference characters. In this manner, the operation and relation of the various units can be more readily followed out and the means of timing and synchronizing the units to operate in completed and continuous cycles can also be followed out. The position of the operator is indicated at 10. The "front" and "rear sides" and "front" and "rear ends" of the machine are indicated in Figure 10 for convenience in describing the various units and their relation later on in the specification.

The feeder unit is indicated at A. The direction of travel of the stock to be glued with respect to the feeder unit A is indicated by the arrow 12. The carrier unit is indicated at B. The carrier unit B carries stock which it receives from the feeder unit A in the direction of the arrow 14. The carrier unit B moves longitudinally on a base B'.

The stationary cutter unit is indicated at C. It is supported on the framework of the feeder unit A. The gluing unit is indicated at D. The assembly table is indicated at E. The direction of travel of stock thereon is indicated by the arrow 16. The gluing unit D is mounted on the framework of the assembly table E.

The movable cutter unit is indicated at F. The unit F is mounted on and carried by the carrier unit B. The rip saw unit is indicated at G. It is mounted on a carriage having wheels which roll on tracks supported on the assembly table E. A carrier clamp is indicated at B'' and an assembly table clamp at E'.

*General description of operation*

Stock to be glued is laid by the operator 10 on the feeder unit A. The stock is carried in the direction of the arrow 12 to the clamp B'' on the carrier unit B. The unit B travels in the direction of the arrow 14, and the cutter unit C dovetails the front edge of the board, as the board is carried past the cutter unit by the carrier unit B.

As the board is carried past the gluing unit D, glue is applied to the dovetailed edge and when the carrier B reaches the end of its stroke adjacent the assembly table E, the clamp B″ is released and the board is shoved into the clamp E′ and clamped thereby. As the carrier B travels in the direction of the arrow 14 the movable cutter unit F thereon is carried past the rear edge of the first board held in the clamp E′ for dovetailing it, at the same time that the forward edge of a second board is being dovetailed by the cutter unit C. The edge of the second board which has been dovetailed by the cutter unit C and has glue applied thereto by the gluing unit D is threaded onto the second edge of the first board, which is held in the clamp E′. These operations are repeated, thus gluing a ribbon of boards together which travels outwardly over the assembly table E in the direction of the arrow 16.

By suitable automatic gauge mechanism, the rip saw unit G is caused to rip off boards of any desired width from the ribbon of boards being assembled on the assembly table E. The operator 10 is in a convenient position to remove these ripped boards from the assembly table and place them on a truck or the like.

*Feeder unit*

The feeder unit A, as shown partially in Figure 10 and in detail in Figures 1, 2, 3, 4 and 5, is mounted on base frame members 18, 20 and 22, which in turn are mounted on a floor surface. Frame members 24 and 26 extend crosswise of the frame members 18, 20 and 22 and support beams 28 located above the members 18 and 22. The frame member 26 is supported by a pair of posts 30 extending upwardly from the frame members 18 and 22.

The frame members 20 and 22 extend out under the base B′ of the carrier unit B, as shown by dotted lines in Figure 10 and other frame members 32 and 34 also support the base B′. The frame members 32 and 34 extend under and support the assembly table E.

Four inclined blocks 38 are mounted on the beams 28. Reversed inclined blocks 40 are mounted on the inclined blocks 38 and are slidable relative thereto. The reversed inclined blocks 40 are secured to laterally extending grate members 42 of angle iron construction. Longitudinally extending members 44 also of angle construction are secured to the laterally extending grate members 42. This forms a grating of the members 42 and 44, which is supported by the inclined blocks 38 and 40.

Lateral movement of the grating is prevented by flange members 46 secured to the sides of the inclined blocks 38. The flanges 46 allow slight movement of the grate member longitudinally of the members 44 and due to the inclined faces of the blocks 38 and 40, such longitudinal movement will raise and lower the grate member and I will therefore refer to it as an "elevating" grate member.

A "movable" grate member is also provided consisting of a transverse supporting plate 48 and longitudinal bars 50 of angle construction. The movable grate is supported and rolls on four rollers 52, which are mounted on brackets secured to the beams 28.

Bearings 54 are mounted on the beams 28 and support a board reversing shaft 56. Reversing disks 58 are secured to the shaft 56 and are provided with laterally extending notches 60 adapted to receive boards from the elevating and movable stock feeding grates.

For moving the movable grate with an oscillating motion, I provide a feeder motor 62 operatively connected by means of a belt 64 with a countershaft 66. By means of a chain 68, the countershaft 66 is connected with a crank shaft 70. A crank 72 is secured to each end of the crank shaft 70. By means of links 74, the crank arms 72 are connected with feeder arms 76.

The feeder arms 76 are secured to a shaft 78, which is journalled in bearings mounted on the base frame members 18, 20 and 22.

By means of link connections 80, the upper ends of the feeder arms 76 are connected with a shaft 82. The shaft 82 is supported in bearings 84 attached to the plate 48. It will now be obvious that operation of the motor 62 will cause rotation of the crank shaft 70 and consequent oscillating movement of the movable feeder grate consisting of the plate 48 and the bars 50.

For rotating the board reversing shaft 56 and the disks 58 thereon in synchronism with the oscillation of the movable feeder grate, I provide a ratchet wheel 84 secured to the shaft 56, a pawl arm 86 rotatable on the shaft and a link connection 88 between the pawl arm 86 and the movable feeder grate shaft 82. A spring pressed pawl 90 is pivoted on the pawl arm 86 and coactable with the ratchet wheel 84. A collar 92 secured to the shaft 56 retains the pawl arm 86 in position.

It will be noted that the inner ends 44a of the bars 44 of the elevating feeder grate stop short of the shaft 56. Supported on a bar 93 is a plurality of short bars 94 in alignment with the bars 44. The inner ends 50a of the bars 50 of the movable feeder grate extend under the shaft 56 and terminate with pusher fingers 96. The purpose of the pusher fingers 96 and of an abutment fence 98 will be disclosed in the "practical operation" of the machine.

The abutment fence 98 is secured to the lateral bars 42 of the elevating feeder grate. The feeder arm shaft 78 extends toward the rear end of the machine for operating a part of the rip saw unit, as will be later described.

For imparting movement to the elevating grate I provide blocks 100 and 102 secured to two of the angles 50. The blocks 100 are adapted to engage the front transverse bars 42 of the elevating grate, as shown by dotted lines in Figure 4, when the feeder arms 76 are in their outward positions. The blocks 102 are adapted to engage the inner transverse bars 42 of the elevating feeder grate, as shown by solid lines in Figure 4 and also in Figure 3, when the feeder arms 76 are at their inner limit of movement.

This arrangement causes the elevating grate to be slightly raised, as shown by solid lines in Figure 4, when the feeder arms 76 are inward and slightly lowered when the feeder arms are outward, as shown by the dotted lines. When the elevating feeder grate is raised, the upper edges of the bars 44 are slightly higher than the upper edges of the bars 50 and when the elevating feeder grate is lowered, the upper edges of the bars 44 are slightly below the upper edges of the movable grate bars 50.

In order to prevent any interference between the upper surfaces of the transverse bars 42 of the movable feeder grate and the under surfaces of the bars 50 of the movable feeder grate, spacer plates 104 are interposed between all the bars 42 and 44.

In order to prevent any interference between the upper surfaces of the plate 48 and the under surfaces of the bars 44, spacer plates 106 are provided between the plate 48 and the bars 50.

Suitably supported adjacent the crank shaft 70 are three control switches S1, S2 and S3. Actuating arms A1, A2 and A3 are carried by the crank shaft 70 for coaction with the switches S1, S2 and S3 respectively, for moving them from either a closed to an open position or an open to a closed position, depending on the position of the crank shaft 70. Detailed operation of the switches S1, S2 and S3 will be referred to under the heading "Electrical controls of the machine".

*Carrier unit*

The carrier unit B is shown somewhat diagrammatically in Figure 10 and in detail in Figures 6, 7, 8, 9, 11, 12 and 15. The carrier unit B includes the base member B' and the carrier clamp B''. The base member B' is supported by the frame members 20, 32 and 34. The base member has guideways 108 in which beads 110 of the carrier table 112 are slidably mounted.

For sliding the carrier table 112 in either direction, I provide a reversible carrier motor 114. The motor 114 is operatively connected by means of a belt 116 and suitable pulleys with a pinion 118. The pinion 118 meshes with a gear 120 mounted on a shaft which also carries a pinion 122. The pinion 122 meshes with a gear 124 which in turn meshes with a rack bar 126 secured to the lower surface of the carrier table 112.

Control switches S4, S5, S6 and S7 are supported on the carrier base B'. A control arm 128 of the switch S4 is connected by a link 130 with a control arm 132 of the switch S5. The control arm 128 carries a roller 134. Secured to the under surface of the carrier table 112 is a switch block 136 adapted to engage and depress the roller 134 when the carrier table is at its forward limit of movement and thus simultaneously operate the switches S4 and S5.

The switches S6 and S7 have similar control arms 138 and 142, respectively, which are connected together by a link 140.

The control arm 138 carries a roller 144 with which a finger 146, carried by an arm 148, may coact for actuating the switches S6 and S7. The arm 148 is secured to a shaft 150 and is connected by a link 152 with an arm 154. The arm 154 carries a roller 156, which is adapted to be engaged by a block 158 when the carrier table 112 is at its rearmost limit of movement. Detailed operation of the switches S4, S5, S6 and S7 will be referred to under the heading "Electrical controls of the machine".

*Carrier clamp*

The function of the carrier clamp B'' is to receive a board from the feeder A, clamp it securely on the carrier whereby the carrier may carry it past the stationary cutter unit C, past the gluing unit D and finally release it, the clamping mechanism having means for pushing the board from the carrier clamp and onto the assembly table. The carrier clamp includes base bars 160 secured to the carrier table 112 and a pair of end bearing brackets 162 upstanding from the table. A base plate 161 is provided on the bars 160.

A pivot shaft 164 is secured in the bearings 162 and clamping arms 166 are pivoted thereon. The lower ends of the clamping arms 166 have a clamping bar 168 secured thereto by cap screws or the like 170. The cap screws 170 extend through vertical slots 172 in the clamping bar 168, whereby the clamping bar is adjustable. Set screws 174 are provided for bearing against the upper edge of the clamping bar 168 for the purpose of adjusting it downwardly and retaining it in any adjusted position. Pads 176 of rubber or the like are secured to the lower face of the angular shaped clamping bar 168.

In order to lower the clamping bar 168, for clamping a board between the pads 176 and the plate 160, a cam shaft 178 is provided. The cam shaft 178 is journalled in the bearings 162 and has secured thereto cams 180.

The cams 180 coact with rollers 182 carried by the upper ends of the clamping arms 166.

For rotating the cam shaft 178, I provide a carrier clamp motor 184 which may be mounted on one of the bearings 162 by means of brackets 186 and 188 (see Figure 6). A belt 190 transmits rotation from the shaft of the motor 184 to a pulley 192 journalled on the forward end of the pivot shaft 164. A sprocket pinion 194 is operatively connected for rotation with the pulley 192 and transmits rotation by means of a chain 196 to a sprocket gear 198. The sprocket gear 198 is secured to a shaft 200 to which a pinion 202 is also secured. The pinion 202 meshes with a gear 204, which is secured to the cam shaft 178.

A discharge plate 206 slidably rests on the base plate 160. The discharge plate 206 is provided with ears 208 which are pivotally connected with links 210. The links 210 are pivotally connected with discharge arms 212, which are secured to a shaft 214. The shaft 214 is journalled in the bearings 162.

Pivoted on the shaft 214 adjacent each arm 212 is a cam member 216. The cam members 216 are connected with the arms 212 by means of bolts 218 extending through slots 220 of the arms. Angle shaped ears 222 are formed on the arms 212 and cap screws 224 extend through the ears 222 and are screw-threaded into the cam members 216.

The parts 218, 220, 222 and 224 are for adjustment purposes.

Roller arms 226 are secured to the cam shaft 178 and carry rollers 228. The rollers 228 are adapted to coact with the cam surfaces 216a of the cams 216. Referring to Figure 12. the direction of rotation of the cam shaft 178 is clockwise so that engagement of the rollers 228 with the cams 216 will swing the arms 212 and consequently the discharge plate 202 to the right or in a discharging direction.

Supported in any desired manner adjacent the cam shaft 178 is a plurality of control switches S8, S9, S10 and S11. Actuating arms A8, A9, A10 and A11 are secured to the cam shaft 178 and coact with the switches S8, S9, S10 and S11 respectively, for moving them from either a closed to an open position or vice versa, depending on the position of the cam shaft 178. Detailed operation of these switches will be referred to under the heading "Electrical controls of the machine".

*Stationary cutter*

In Figure 10, the stationary cutter is indicated by the reference character C and its details are illustrated in Figure 15 and in Figures 23 and 24 on Sheet 4 of the drawings. A U-shaped bracket 230 is provided attached to the frame member 28 of the feeder unit A whereby it will be seen that this bracket is stationary. Hubs 232 are formed on the ends of the bracket 230 and rotatably support a shaft 234. The shaft 234 has reduced ends 236, which are eccentric relative to the shaft itself, as shown by dotted lines in Figure 24.

A supporting bracket 238 has a pair of ears 240 mounted on the eccentric reduced portions 236 of the shaft 234. An adjusting lever 242 is secured to one of the reduced portions 236, whereby swinging the lever will rotate the shaft 234, thus raising or lowering the bracket 238 relative to the stationary bracket 230. The adjusting lever 242 may be retained in any desired position by means of a slot and cap screw connection 244 and 246, respectively, with the supporting bracket 238.

The ears 240 include bearing caps 248 which may be loosened when it is desired to adjust the height of the supporting bracket 238 relative to the stationary bracket 230 and which may thereafter be tightened for rigidly locking the shaft 234 relative to the supporting bracket 238. Motor brackets 250 and 250a are secured to the under surface of the supporting bracket 238 and are adjustable in a direction parallel with the shaft 234 by means of screws 252 and 252a.

Cutter motors 254 and 254a are secured to the brackets 250 and 250a respectively. Dovetail groove cutters 256 and 256a are mounted on the shafts of the motors 254 and 254a respectively. As shown diagrammatically in Figure 17, the dovetail groove cutters 256 and 256a cooperate with each other to cut a dovetailed groove 258 in one edge of the stock on which the machine operates. The adjusting screws 252 and 252a may be used for regulating the depth of the cut and the adjusting shaft 234 may be manipulated for raising or lowering the cutters 256 and 256a for placing the dovetailed groove 258 in the center of thicker or thinner stock, as desired.

It will be remembered that the dovetailed groove 258 is tapered from end to end so that when a dovetailed tongue is threaded therein the edges of the boards may be tightened relative to each other by longitudinal sliding movement. In order to cut the groove 258 on a taper I provide an arm 260 rigidly secured to the supporting bracket 238 and extending downwardly therefrom. By means of a link connection 262, the arm 260 is connected with an arm 264 which in turn is secured to a shaft 266 (see Figures 2, 3 and 7). The shaft 266 is suitably supported for oscillating movement and extends to the rear side of the carrier base B'.

The rear end of the shaft 266 has secured thereto a roller arm 268 on which a roller 270 is journalled. The roller 270 is adapted to coact with an inclined bar 272 carried by the carrier and which I will accordingly term an "inclined carrier bar".

From the description just made, it will be obvious that the carrier B in its back and forth movement will carry the inclined carrier bar 272 with it and thereby slightly raise and lower the roller 270, thus imparting a slight oscillating movement to the shaft 266. This movement will be imparted to the supporting bracket 238 and consequently to the cutters 256 and 256a with the result that one of them will be raised and the other lowered when the carrier B travels in one direction and vice versa when it travels in the other direction. It will accordingly be obvious that this oscillating motion will cause the dovetailed groove 258 to be cut on a slight taper, depending on the degree of inclination of the inclined carrier bar 272.

For keeping the roller 270 in contact with the inclined bar 272, I provide a spring 274 (see Figure 2).

Gluing unit

The edge of the stock with the dovetailed groove 258 therein must have glue applied thereto before the boards are assembled edge to edge. The gluing unit is indicated at D in Figure 10 and is illustrated in detail in Figures 18 and 19. This unit is stationarily supported by means of brackets 276, 278 and 280 secured to a frame member 282 on the frame member 32 of the assembly table E. Immediately after the dovetailed groove 258 is cut, the front edge of the stock travels past a glue applying roller 284. The glue applying roller 284 has its lower edge dipping in glue 286. The glue 286 is contained in a glue vat 288 supported by the bracket 276. The vat 288 is omitted in Figure 19 of the drawings.

Rotation is imparted to the glue applying roller 284 from a shaft 290. The shaft 290 is journalled in a sleeve 292 which is supported by the brackets 278 and 280. A drive pulley 294 is secured to the upper end of the shaft 290 and is operatively connected with a pulley 296 by means of a spring belt 298.

The pulley 296 is secured to a glue applying roller shaft 300 to which the roller 284 is also secured. The shaft 300 is journalled in a bearing 302. The bearing 302 is supported on the outer end of an arm 304. The inner end of the arm 304 is secured to a bracket 306, which is rockable on the sleeve 292. A collar 308 limits the bracket 306 against downward sliding movement relative to the sleeve 292, this sleeve being inclined as shown in Figure 18.

An actuating arm 310 is secured to the lower end of the bracket 306. A spring 312 is secured to one end of the arm 310 and connected with the stationary frame member 282. A stop bar 314 is secured to the bracket 306 and adapted to contact with a stationary part of the machine, such as the upper flange of the frame member 282 to limit the pivotal movement of the bracket 306, as imparted thereto by the spring 312. An adjusting screw 316 is carried by the stop arm 314 and is adjusted so that when the stock passes the glue applying roller 284, it will slightly depress the roller against the action of the spring 312. Thus the spring serves to resiliently maintain the glue applying roller 284 in contact with the dovetailed edge of the stock.

For imparting rotating movement to the glue applying roller 284 in exact accordance with the movement of stock past the roller, I provide for rotating the roller in accordance with the to and fro travel of the carrier B. This is accomplished by means of a pulley 318 secured to the shaft 290 and having a belt 320 wrapped once therearound and having its ends secured to the forward and rearward ends of the carrier B, the rear end connection being indicated at 322 in Figure 18.

The movable cutter unit F carried by the carrier B comes to a position opposite the roller 284 when the carrier is in its forward position, as shown in Figure 10.

To prevent the glue applying roller 284 from coming in contact with the cutters of the movable cutter unit, I provide a raised portion 324 on the arm 310 with which a cam bracket 326 secured to the plate 161 may coact when the carrier B is in its forward position. The cam bracket 326 depresses the portion 324 of the lever 310, thus lowering the glue applying roller 284.

Assembly table

The assembly table is indicated diagrammatically in Figure 10 at E and is shown in detail in Figures 20, 21 and 22. It is mounted on the frame members 32 and 34 and the frame member 282, which is arranged crosswise of the frame members 32 and 34. Other frame members 328 parallel with the frame member 282 and mounted at the front side of the machine and frame members 330 parallel with the members 32 and 34 constitute the supporting framework of the assembly table E. The assembly table E includes a stationary table portion 332 carried by an I beam 334, a movable table portion 336 carried by the rip saw unit G and an inclined receiving table portion 338.

Assembly table clamp

The assembly table clamp is indicated diagrammatically at E' on Figure 10. It is illustrated in detail in Figures 20, 21 and 22. It comprises a clamping bar 340 having pads 342 on the under surface thereof adapted to clamp stock between these pads and the stationary table portion 332.

The clamping bar 340 is carried by vertically slidable rods 344, the upper ends of which are slidable through brackets 343 attached to the stationary table portion 332 of the assembly table and bearings 346 secured to the frame member 282. Heavy coil springs 348 are interposed between adjusting nuts 350 and the brackets 343 to serve when released the purpose of resiliently holding the clamping bar 340 in a lowered clamping position.

A means is provided for releasing the assembly table clamp E' consisting of a pair of bars 352 secured to opposite sides of the rods 344 and connected by links 354 with bell crank arms 356. The bell crank arms 356 are connected together by a link 358 for simultaneous movement whereby to raise the rods 340 in synchronism.

For reciprocating the link 358 and consequently raising the clamping bar 340 or allowing it to be lowered by the springs 348, I provide an arm 360 and a link 362. The arm 360 is secured to the shaft 150 (see Figure 9).

From the construction of the parts just described it will be obvious that when the block 158 of the carrier B engages the roller 156 and depresses it, thereby through the arms 154 and 148 and the link 152 rocking the shaft 150, the shaft will impart oscillation to the arm 360 for raising the clamping bar 340 when the carrier B is at its rearmost limit of movement.

The clamping bar 340 is adjustable for different thicknesses of boards by rotating nuts 341 on the rods 344.

Movable cutter unit

The movable cutter unit is indicated diagrammatically in Figure 10 at F. In most respects, it is similar to the stationary cutter unit C except the unit C is inverted. It is shown in detail in Figures 7, 11 and 15 of the drawings. Bearings 364 are supported on the carrier table 112. A shaft 366 is both slidably and rotatably mounted in the bearings 364. Eccentric reduced ends 368 are provided on the shaft 366. A supporting bracket 370 is provided with capped ears 372, which may be loosened by unscrewing cap screws 373 for adjustment purposes and retightened after adjustment is made. Adjustment is made by swinging an adjusting arm 374, which is secured to one of the reduced ends 368 of the shaft 366.

Motor brackets 376 and 376a are adjustably supported on the supporting bracket 370 and are slidable in a direction parallel with the axis of the shaft 366. Adjusting screws 378 and 378a are provided for adjusting the motor brackets relative to the supporting bracket 370. Motors 380 and 380a are carried by the brackets 376 and 376a, respectively. Dovetail tongue cutters 382 and 382a are mounted on the shafts of the motors 380 and 380a.

When the carrier unit is moving in a forward direction, it is desired that the cutters 382 and 382a do not engage the edge of a board held in the assembly table clamp E'. A spring 384 (see Figures 7 and 11) is provided for normally keeping the cutters in an engaging position. One end of the spring 384 is connected with a stationary pin 386 extending upwardly from the carrier and the other end is connected with a pin 388 extending downwardly from the supporting bracket 370. A link connection 390 is provided between the bracket 370 and an upwardly extending arm 392 secured to a rock shaft 394. The rock shaft 394 is journalled in bearings 396 supported on the carrier and has a cam arm 398 secured to its other end. The cam arm 398 is maintained in contact with a cam 400 mounted on the cam shaft 178 of the carrier clamp B''. The cam 400 is so shaped that when the carrier B is traveling in a forward direction and the cam shaft 178 is in one of its stopped positions, the cam 400 engages the cam arm 398 to retract the cutters 382 and 382a. When the carrier B is traveling in the other direction and the cam shaft 178 assumes its other stationary position, the spring 384 moves the cutters 382 and 382a into cutting position. It will be remembered that the shaft 366 is slidably mounted in the bearings 364 for this purpose.

It is desired to cut the dovetailed tongue 402 of the stock (see Figure 16) on a taper so that it will fit in the tapered groove 258 of the stock previously dovetailed by the cutters 256 and 256a and which is now being held by the assembly table clamp E'. This is accomplished by an arm 404 connected with the supporting bracket 370 and carrying a roller 406.

The roller 406 rides on a stationary inclined bar 408 supported by brackets 410 on the carrier base B'. Since the bar 408 is inclined, slight oscillating movement will be imparted to the shaft 366 for thus tapering the dovetailed tongue cut by the cutters 382 and 382a.

When the height of the cutters 382 and 382a is adjusted by rotating the shaft 366 by means of the adjusting arm 374, it is also necessary to adjust the height of the forward end of the arm 404 relative to the roller 406 to maintain the bracket 370 in a substantial level position. A means for simultaneously adjusting the supporting bracket 370 and the roller 406 relative to the arm 404 is provided by mounting the roller on a reduced eccentric portion 412 of a shaft 414. The shaft 414 is secured to an arm 416 which is connected by a link 418 with the adjusting arm 374, the arms 416 and 317 being parallel with each other and of equal length. The eccentricity of the portion 412 of the shaft 414 is identical with the eccentricity of the portions 368 of the shaft 366. The outer end of the arm 404 is split and a cap screw 417 is provided for tightening this end relative to the shaft 414 after adjustment is made.

To maintain the roller 406 in contact with the stationary inclined bar 408 I provide a spring 419 (see Figures 7 and 11).

Rip saw unit

The rip saw unit is indicated at G in Figure 10 and its details of construction are illustrated in Figures 20, 21 and 22 of the drawings. A primary carriage consisting of end brackets 420, connecting bars or tracks 422, shafts 424 and flanged wheels 426 is provided. The flanged wheels 426 travel on the frame members 330, which act as tracks for them. Both ends of the primary carriage are retained in exact parallelism by means of arms 428, a floating shaft 430 and arms 432. The arms 428 are secured to the floating shaft 430 and the arms 432 are journalled on a shaft 434 supported by brackets 436.

Springs 438 are connected with the arms 428 and with the stationary frame member 282 to normally retain the primary carriage 420 in a predetermined position with respect to the assembly table E. Stops or bumpers 440 may be provided on the tracks 330 to limit the movement of the primary carriage as imparted thereto by the springs 438.

A secondary carriage is mounted for travel on the tracks 422 and consists of a frame 442, end brackets 444 and flanged wheels 446. The flanged wheels 446 are secured to shafts 448, which are journalled in bearing portions of the brackets 444.

A motor bracket 450 is pivoted on the front shaft 448 and supports a rip saw motor 452. A rip saw 454 is mounted on the shaft of the motor 452.

The rip saw 454 is adapted to be maintained in raised position by means of a pin 456, which is constrained to move in one direction by springs 458. The pin 456 engages under a lug 460 of a lever 462. The lever 462 is secured to a rock shaft 464 which is journalled in bearings of the frame 442. The lever 462 is connected by a link 461 with the motor 452. A spring 466 serves to partially counterbalance the weight of the motor and rip saw.

The pin 456 is provided with an armature 468 which extends into a solenoid 470. It will be obvious that when the solenoid 470 is energized, it will act upon the armature 468 for withdrawing the pin 456 from beneath the lug 460, thus allowing the rip saw 454 to drop to the dotted line position shown in Figure 20, the arm 462 thereupon assuming the dotted line position illustrated.

For propelling the secondary carriage along the tracks 422, I provide an arm 471 extending from the carrier B and supported on frame members 473. A member 475 (see Figures 7, 11 and 15) is a brace for the arm 471. As shown in Figure 20, a bracket 477 extends upwardly from the frame 442 to engage the arm 471. A hook lever 472 is pivoted on a shaft 474, which is mounted on the frame 442 and has a lug 476 which normally remains in a lowered position, but can be raised as shown by dotted lines so that it is in the path of movement 478 of the arm 471.

The lever 472 and its hook 476 are raised by an arm 480 secured to the shaft 464 (see Figure 21). The arm 480 carries a pin 482 which engages under the lever 472 and raises it whenever the rip saw is in lowered position.

Stock assembled on the stationary assembly table 332 (see Figure 22) is projected out over the movable assembly table 336 until it engages a gauge bar 484. The gauge bar 484 is adjustable on rods 486, which are secured to the brackets 420 of the primary carriage of the rip saw unit. The stock overhangs a rest bar 488 which is supported on rods 490 which are also secured to the bracket members 420. The projected ribbon of stock moves the primary carriage along the tracks 330 against the action of the springs 438. Soon after engagement of the stock with the gauge bar 484, control switches S12 and S13 carried by the rear bracket 420 and a bracket 492 on the frame member 282 (see lower right hand side of Figure 22) operate to energize the solenoid 470 for thereby dropping the rip saw 454 into ripping position. The switch S12 is controlled by a cam block 494 on the rear track member 330 and the switch S13 is controlled by the rear assembly table clamp rod 334. The exact manner in which these control switches control the solenoid will be described under the heading, "Electrical controls of the machine".

Referring to Figure 20, it will be noted that a hook end 496 of the arm 462, which is connected with the rip saw motor, assumes a raised position when the rip saw is in lowered position.

As shown at the right side of the figure, this hook comes under a coacting hook 498 of a rod 500. The rod 500 is slidably supported in a stationary bracket 502 and is pivoted to an arm 504. The arm 504 is mounted on the shaft 78, which it will be remembered extends from the feeder unit A, it being the oscillatable shaft on which the feeder arms are mounted.

The hook 498 is shown in its normal or raised position and it will be obvious that when it is lowered, it will lower the hook lug 496, thereby raising the rip saw so that the latch pin 456 can be projected beneath the lug 460 by the springs 458.

*Practical operation*

In the operation of my automatic gluing and assembling machine, boards of random widths but preferably of substantially equal length are laid upon the feeder unit A by the operator 10. The boards or stock are butted against the fence 98 and are laid upon the grate bars 44 and 50. The operator matches the grain of the boards if this is desirable and when the boards are laid upon the feeder unit in matched position, they will be finally assembled in the same position, as will later be described.

The boards are advanced along the grate bars 44 and 50 toward the notched disks 58.

The boards are advanced by reciprocation of the movable feeder grate and alternate elevating and lowering of the elevating feeder grate. When the movable feeder grate is in its forward position, the elevating grate drops due to the inclined block mounting 38—40 thereof and the stock will rest upon and move with the movable feeder grate on its return stroke toward the rear of the machine. When near the rear end of this stroke, the elevating grate is raised by movement of the movable grate, thereby lifting the boards free from the movable grate. The boards thus lifted will not follow the sliding bars on their return stroke forward and the result is that the boards will be continuously worked or advanced rearwardly as long as the table is in operation.

The stock will be fed into the notches 60 which happen to be in alignment with the stock and when the stock engages the bottom of the notches, continued rearward movement of the grate bars 50 will merely cause a sliding movement of the grate bars under the stock. At the rearward end of the stroke of the movable grate, the plate 48 will engage the blocks 102, thereby raising the elevating grate so that on the return stroke of the movable grate it will not engage the stock and carry it back with it.

On the return stroke of the movable feeder grate, the pawl 90 carried by the arm 86 will cause a quarter rotation of the notched disks 58 and successive quarter rotations will rotate the stock fed thereto and turn it upside-down on the stationary grate bars 94. The purpose of this reversing is so that when the boards are subsequently dovetailed and fed in a reversed direction over the assembly table, they will be matched the same as when placed on the feeder unit. For disengaging the stock from the notched disks and pushing it onto the carrier, the pusher fingers 96 are provided which assume a position adjacent the reversing shaft 56 when the movable feeder grate is in a forward position and thus are positioned behind the stock resting in the notches 60 and on the stationary bars 94. Subsequently, when the movable feeder grate is moved rearwardly, the fingers 96 engage the front edge of the stock and push it to position to be clamped by the clamp B''. The exact movements of the feeder parts with relation to the carrier and its clamp will be later described.

The stock, in being pushed onto the plate 160 engages the plate 206 thereon (see Figure 12) and pushes it a varying distance rearward, depending upon the width of the particular piece of stock being pushed onto the plate 160 by the feeder unit. After the stock is pushed under the clamp pads 176, the clamp is closed by rotation of the cams 180 as caused by the motor 184 whereupon the carrier B is caused to travel in a rearward direction by energization of the motor 114.

In its rearward travel, (in the direction of the arrow 14) the carrier B causes the first piece of stock to be cut by the cutters 256 and 256a of the stationary cutter unit C. These cause a dovetail tapered groove 258 to be formed in the forward edge of the stock and glue is applied to this edge by the gluing unit D.

When the carrier B has reached the rearward end of its stroke it is automatically stopped, the assembly table clamp E' having been opened during the last few inches of its stroke, the carrier clamp B'' is then open and the stock is pushed out under the assembly table clamp E' by rotation of the cam shaft 178 causing the roller 228 to engage the cam surface 216a of the member 216 and pushing the plate 206 forwardly.

Such rotation of the cam shaft 178 also moves the movable cutter unit F toward the rear side of the machine against the action of the spring 384. Soon after the carrier unit B starts returning in a forward direction, by reversing the rotation of the motor 114, the block 158 leaves the roller 156, thereby allowing the assembly table clamp springs 348 to act upon the clamp bar 340 to securely clamp the first piece of stock in the assembly table clamp E'. On the return travel forward of the carrier unit B, the cutters 382 and 382a, thus clear the rear edge of the first piece of stock being held by the assembly table clamp.

As the carrier unit B is traveling rearwardly on its second trip, the stationary cutters C cut the edge of a second piece of stock, the movable cutters F cut the edge of the first piece and glue is applied to the dovetailed edge of the second piece of stock immediately after it is dovetailed and it is thereafter threaded onto the dovetailed tongue 402 which is being cut on the first piece of stock now held in the assembly table clamp. By the taper of the dovetailed tongues and grooves the boards are assembled edge to edge without the use of gluing clamps, which are ordinarily necessary. The taper of the dovetailed tongues and grooves is slight and consequently it takes but a very slight working movement of the cutter units to taper the cut. This actually twists the cutter knives slightly, but any tendency toward misalignment or binding of the cutters relative to the stock is eliminated by providing an initial clearance angle great enough to exceed any tendency to bind.

Referring to Figure 13, a diagrammatic arrangement illustrates the movement of the movable feeder grate, carrier and carrier clamp B'' on the carrier. The switches S1, S2, S3, S4, S5, S6, S7, S8, S9, S10 and S11 are illustrated diagrammatically and the cycle of operations as to just how these switches perform their duties can be traced in this figure as follows. Assuming the feeder has just moved to rearward position, the arm A1 on the feeder crank shaft 70 engages and closes the normally open switch S1 for actuating the clamp motor 184 to turn the cam shaft 178 a half revolution for closing the carrier clamp B″. Also the arm A2 engages and opens the normally closed switch S2 for stopping the feeder unit motor 62.

Since the clamp is being actuated to closed position, it will travel downwardly as shown whereupon the arm A10 on the cam shaft 178 engages and closes the normally open switch S10 and thereby starts the carrier unit B in a rearward direction by energizing the motor 114 and also starts the movable feeder grate in an outward direction by energizing the motor 62.

The carrier is traveling in a rearward direction. As soon as it reaches its rearward limit of movement, as set by the block 158 which engages the roller 156, the normally open switch S6 is closed for energizing the clamp motor 184 and thereby opening the clamp and the normally closed switch S7 is opened for stopping the carrier motor 114. The carrier will now remain in the rearward position, while the clamp B″ is being opened and as soon as it is opened, as shown by the dotted line position, the normally open switch S8 will be closed for energizing the motor 114 in a reversed direction and the normally closed switch S9 will be opened for stopping the clamp motor 184 with the clamp in an opened position.

The carrier unit is traveling forward. At its forward limit of movement, the block 136 will actuate the switches S4 and S5 for starting the feeder motor 62 and stopping the forward movement of the carrier unit B. The cycle of operations will then be repeated indefinitely as long as the current supply is maintained. The exact circuit for these various switches will be described in detail.

The ribbon of boards being fed onto the assembly table E, when they engage the gauge bar 484, will move the primary carriage along the tracks 330 for thereby causing the normally open switch S12 (Figure 14) to be closed by reason of its roller arm engaging the cam member 494. This switch is connected in series with the solenoid 470 but a normally open switch S13 is also connected in series in the circuit and consequently the solenoid cannot be energized except when both of these switches are in closed circuit position as caused by both forward movement of the primary carriage along the tracks 330 and the assembly table clamp E′ being closed. Thus the stock being projected onto the assembly table by the plate 206 when the carrier B is at its rearward limit of movement will open the switch S12 and the solenoid 470 will not be energized until the carrier unit has started to return in a forward direction and has allowed the clamp E′ to close and consequently allow closure of the switch S13. When both switches are closed the solenoid will remain energized only until the carrier starts on its return stroke forward and the assembly table clamp E′ closes, thus opening the switch S13. After a board has been ripped off it falls onto the table 338 and the springs 438 then return the primary carriage to normal position against the bumpers 440. Thus the rip saw is dropped to ripping position only when the ribbon of boards has engaged the bar 484 and moved the primary carriage toward the front side of the machine and only immediately after the clamp E′ has been closed.

Subsequently the arm 471 projecting from the carrier unit B will engage the hook 476 of the lever 472 for propelling the secondary carriage and the rip saw in a forward direction for ripping off a board of predetermined width from the ribbon of boards. The rip saw will thereafter be returned to initial position in a manner to be later described and after it has been returned it remains in its returned or initial position with the saw running but not lowered until another board of sufficient width is ready to be ripped off.

Certain conditions are necessary before the rip saw cuts off a predetermined width of the assembled stock. These conditions will here be briefly outlined in order to clarify the operation of this particular part of the machine.

(1) The machine must have glued and assembled enough stock that the ribbon of stock has extended to the gauge 484 whatever its setting for desired widths may be.

(2) The primary saw carriage must have been pushed toward the front of the machine along the rails 330 so that the roller arm of the normally open switch S12 has been raised by the cam block 494 to complete an electric circuit through the switch.

(3) The carrier B must be at the extreme end of its rearward stroke, which insures that the secondary saw carriage is at the rear ends of the rails 422 and adjacent the stops 423.

(4) The assembly table clamp E′ must be in wide open position (it being operated to such position by the carrier B when at the extreme end of its rearward stroke).

(5) The normally closed switch S13 must have its roller arm released by raising of the rod 344, which occurs whenever the assembly table clamp is open.

(6) The motor 452 operating the rip saw 454 must be running. This is insured by the fact that the control circuit through switches S12 and S13 and the solenoid 470 is taken from the power leads of the saw motor, as shown in Figure 14.

Now when all these conditions are fulfilled, a complete closed circuit is affected through switches S12 and S13 which energizes the solenoid 470 for withdrawing the latch pin 456 and allowing the saw to drop to cutting position. All these must happen before the carrier B starts on its return stroke toward the front end of the machine. When the carrier B starts on such return stroke the assembly table clamp E' is allowed to close by the action of the springs 348 and the arm 471 must travel from the lug 477 to the raised lug 476 whereupon the rip saw will be drawn toward the front end of the primary carriage by movement of the carrier B. This movement of the arm 471 before starting movement of the saw carriage is necessary to allow the assembly table clamp E' to close before the saw reaches the boards to be ripped. The movement of the arm 471 from the lug 477 to the lug 476 is permissible, because the carrier B has a length of travel greater than the stock being worked upon by the distance between the feeding table and the assembly table.

Movement of the rip saw, as caused by the arm 471, rips a piece of stock from the ribbon of stock and such piece is prevented from pinching the saw by the support 488. The piece ripped off falls onto the inclined table portion 338.

As before explained, operation of the feeder unit A raises the rip saw after it has been propelled forwardly by the carrier unit B. It will be remembered that after the carrier unit assumes its forward position, the movable feeder grate is moved forwardly and in this forward movement the arm 504 is depressed and likewise the hook 198 is depressed for raising the rip saw and relatching it in raised position by means of the pin 456. When the carrier unit B travels in a rearward direction, the arm 471 engages the bracket 477 for returning the secondary carriage to initial position adjacent stop blocks 423 mounted on the tracks 422.

The hook 498 is moved to raised position whenever the feeding table has completed its stroke toward the front side of the machine. This stroke, caused by the clamp B'' actuating the switch S10 (see Figure 13), is thus completed soon after the carrier B starts on its stroke toward the rear end of the machine so that the hook 498 is always in raised position before the carrier B on its return stroke forward carries the lug 496 of the rip saw unit from under the hook 498. This is necessary since the hook 498 must be in up position before saw carriage starts on travel to rear end of machine.

*Electrical controls of the machine*

Referring to Figure 14, the various switches S1, S2, S3, S4, S5, S6, S7, S8, S9, S10 and S11 are illustrated in an electrical hook-up diagram. A control switch for the feeder motor 62 is indicated at 506. Control switches 508 and 510 are provided for the reversible carrier motor 114 and a control switch 512 is provided for the clamp motor 184. The arms A1, A2 and A3 mounted on the feeder crank shaft 70 and arms A8, A9, A10 and A11 mounted on the carrier cam shaft 178, as well as the blocks 136 and 138 on the carrier unit B are shown diagrammatically. The circuit as controlled by the switches as set forth in Figure 13 can be traced on Figure 14. The switches S12 and S13 are also shown which control the solenoid 470 for lowering the rip saw to sawing position.

The feeder, carrier and clamp motors 62, 114 and 184 are of the type having automatically applied brakes as soon as the motors are de-energized. Diagrammatically illustrated at 516 these brakes are shown as solenoids, which release brake bands against the action of springs, the springs normally closing the brake bands when the solenoid is de-energized.

The stationary and movable cutter motors 254, 254a, 380 and 380a and the rip saw motor 452 are directly energized for continuous operation whenever the main switch 514 is closed. A secondary switch 515 is also provided for "inching" of the machine. It is preferably controlled by push buttons located at convenient points on the machine so that when "setting up" for any particular job the progress of the operations can be checked and adjusted in a manner similar to printing press controls.

The switches 506, 508, 510 and 512 are of the automatic type, each being actuated to closed position by a solenoid or the like energized by the control switches and normally actuated to open position by springs. These switches are merely shown diagrammatically and since they are in general use, need not be further described.

From the foregoing description, it will be seen that I have provided an entirely automatic machine to which an operator may feed stock of random widths and from which he may take boards of equal width, which have been assembled edge to edge, the joints being well glued and clamped together. The machine can be adjusted for working on various thicknesses of boards and will take care of any widths fed to it between the limits of the movement of the movable feeder unit and the depths of the notches 60 in the reversing disks 58.

I have provided a machine in which the feeder, at the end of its feeding stroke automatically stops, and starts the carrier clamp to close. As soon as the clamp is closed, its closing movement is stopped, the feeder is returned to forward position and the carrier with the board clamped therein is started rearwardly. As soon as the carrier reaches its rearward limit of movement, it automatically stops and both the carrier clamp and the assembly table clamp are opened. As soon as the carrier clamp is opened, its opening movement is stopped and the carrier unit is started forwardly until it is automatically stopped at its forward limit of movement and also automatically starts the feeder unit to perform another feeding operation.

Thus the various units are interdependent as regarding their automatic cycle of operations and one unit does not commence its prescribed operation until the one operating just before it has completed its particular cycle of operations.

The stock is automatically assembled in matched relation and automatically ripped into the various desired widths. The machine is readily operable by a single operator and has substantial value in making narrow widths of boards useful by assembling them in edge to edge relation and cutting them into desired widths.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. A machine of the character described including a movable carrier for assembling stock, an assembly table, to receive said stock after assembly, means for projecting the assembled stock across said table and a rip saw mechanism mounted on said assembly table, said rip saw mechanism comprising a carriage engageable and shiftable by the assembled stock as it is being projected across said assembly table and means operatively connected with said movable carrier for moving said rip saw along its ripping course after said carriage is shifted by said assembled stock.

2. A machine of the character described including an assembly table, mechanism for assembling stock in edge to edge relation thereon, means for projecting the assembled stock across said table after assembly thereof and a rip saw mechanism mounted on said assembly table, said rip saw mechanism comprising a carriage engageable and shiftable by the assembled stock as it is being projected across said assembly table, means for moving said rip saw relative to said carriage to ripping position after said carriage is shifted by said assembled stock and means for thereafter causing movement of the rip saw to rip a piece from said assembled stock and for raising said saw relative to said carriage after such ripping operation.

3. A machine of the character described including an assembly table, mechanism for assembling stock in edge to edge relation thereon, means for projecting the assembled stock across said table after assembly thereof and a rip saw mechanism mounted on said assembly table, said rip saw mechanism comprising a carriage engageable and shiftable by the assembled stock as it is being projected across said assembly table, means for moving said rip saw relative to said carriage to ripping position after said carriage is shifted by said assembled stock, means for thereafter causing movement of said rip saw to rip a piece from said assembled stock, for raising said saw relative to said carriage after such ripping operation and for returning it to initial position.

4. In a machine of the class described, a table to receive stock, means to advance said stock across said table and invert the stock thereon, a carrier to receive stock from said table and advance it at right angles to its travel on said table and means for moving said stock from said carrier and again at right angles to its travel with the carrier but in the opposite direction to its first advance and for assembling it with other stock previously so advanced.

5. A method of assembling stock edge to edge comprising the placing of pieces of stock on a feeder in matched relationship to each other, the reversing of said stock on said feeder, the feeding of said stock from said feeder to a carrier, the holding of a first piece of stock with one edge thereof jointed in stationary position on the near side of said carrier, the carrying of a second piece of stock with one edge thereof jointed longitudinally relative to the first piece of stock also on the near side of said carrier and the assembly of said pieces of stock by movement of said carrier with their jointed edges in contact.

6. A method of assembling stock in edge to edge relationship comprising the placing of narrow pieces of stock on a feeder table in predetermined relationship to each other, the subsequent inversion of said pieces of stock thereon, the moving of said pieces of stock one by one off said feeder table in one direction and onto a carrier, the jointing of the opposite edges of said pieces of stock in tongue and groove formation, the moving of said pieces of stock one by one off said carrier in an opposite direction and the longitudinal assembly of said pieces of stock together in a relation the same as they were placed on the feeder table.

7. A machine of the character described including a feeding mechanism adapted for having narrow pieces of stock laid thereon in predetermined relationship, means for discharging the pieces of stock sidewise one by one in one direction from said feeding mechanism, means for jointing the edges of said pieces of stock for applying glue to the edges and for moving the stock sidewise in an opposite direction and inverting it on the feeding mechanism whereby it may be assembled edge to edge after said application of glue in the same relation it bore when placed upon said feeding mechanism.

8. A method of assembling stock edge to edge comprising the placing of pieces of stock on a feeder in matched relationship to each other, the reversing of said stock on said feeder, the feeding of said stock in one direction from the feeder to a carrier, the movement of the first piece of stock in an opposite direction from the carrier and the joining of a second piece of stock on the carrier to the first piece in edge to edge relationship.

9. In a machine of the character disclosed, a feeder, a carrier and an assembly table, said feeder and assembly table being arranged side by side and spaced from each other and having stationary stock supporting parts whereby an operator between the two and adjacent the outer ends thereof may both feed stock to the stationary part of the feeder and take assembled stock from the stationary part of the assembly table, said carrier being longitudinally reciprocable across the inner ends of said feeder and assembly table for receiving stock moving in one direction from the feeder, carrying such stock to the assembly table and discharging it in an opposite direction thereon.

10. In a machine of the character disclosed, a feeder, a carrier and an assembly table, said feeder and assembly table being arranged side by side and spaced from each other whereby an operator between the two and adjacent the outer ends thereof may both feed stock to the feeder and take assembled stock from the assembly table, said carrier being longitudinally reciprocable across the inner ends of said feeder and assembly table for receiving stock moving in one direction from the feeder, carrying such stock to the assembly table and discharging it in an opposite direction thereon, means for inverting the stock while on the feeder and means for jointing the stock and then assembling it edge to edge on the assembly table.

11. A machine of the character disclosed including a table, means for projecting a continuous ribbon composed of narrow pieces of stock assembled together edge to edge thereonto, a cut-off saw tending to move to cutting position for cutting said ribbon into comparatively wider pieces of stock, a solenoid released latch for retaining said cut-off saw in non-cutting position, means engaged by the advancing edge of said ribbon for causing energization of said solenoid and means for thereafter subsequently advancing the cut-off saw through said ribbon and returning it to non-cutting and to initial position.

12. A machine of the character disclosed including a table, a reciprocable carrier for projecting a continuous ribbon composed of narrow pieces of stock assembled together edge to edge thereonto, a cut-off saw for cutting said ribbon into comparatively wider pieces of stock, means for normally retaining said cut-off saw in raised position, means engaged by the advancing edge of said ribbon for releasing said cut-off saw and thereby allowing it to lower to cut-off position, means operable from said reciprocable carrier for subsequently advancing the cut-off saw through the ribbon, means for raising the cut-off saw and means operable from said reciprocable carrier for returning it to initial position.

13. A machine of the character disclosed including a table, a movable feeder, a reciprocable carrier to receive stock therefrom and for projecting a continuous ribbon composed of pieces of said stock assembled edge to edge onto said table, a cut-off saw for cutting said ribbon into comparatively wider pieces of stock, means for normally retaining said cut-off saw in raised position, means engageable by the advancing edge of the ribbon for releasing said last means, means operable from the reciprocable carrier for advancing the cut-off saw through the ribbon, means operable from the movable feeder for raising it and rendering the retaining means therefor again operative and means operable from the reciprocable carrier for returning the cut-off saw to initial position.

14. A machine of the character described including a movable carrier for assembling stock, an assembly table to receive said stock after assembly, means for projecting the assembled stock across said table, a rip saw mechanism mounted on said assembly table, said rip saw mechanism comprising a carriage engageable and shiftable by the assembled stock as it is being projected across said assembly table and means operatively connected with said movable carrier for moving said rip saw along its ripping course after said carriage is shifted by said assembled stock and for returning said rip saw along said course to its initial position.

15. A machine of the character described including a reciprocable carrier for assembling stock, an assembly table to receive said stock after assembly, means for projecting the assembled stock across said table, a rip saw mechanism mounted on said assembly table and means operated by said reciprocable carrier for moving said rip saw along its ripping course when said carrier moves in one direction and for returning said saw along said course when said carrier moves in an opposite direction.

16. A machine of the character described including a movable carrier for assembling stock, an assembly table to receive said stock after it is assembled, means for projecting the assembled stock across said table, a rip saw mechanism mounted on said assembly table and means operated by said movable carrier for moving said rip saw along its ripping course upon movement of said carrier.

17. A machine of the character described including a reciprocable carrier for assembling stock, an assembly table to receive said stock after assembly, means for projecting the assembled stock across said table, a rip saw mechanism mounted on said assembly table, means engageable by the assembled stock as it is being projected across said assembly table for moving said saw to ripping position and means operated by said reciprocable carrier for moving said rip saw along its ripping course when said carrier moves in one direction and for returning said saw along its course to initial position when the carrier moves in an opposite direction.

18. A machine of the character described including a movable carrier for assembling stock, an assembly table to receive said stock after it is assembled, means for projecting the assembled stock across said table, a rip saw mechanism mounted on said assembly table, means engageable by the assembled stock as it is being projected across said assembly table for moving said saw to ripping position and means operated by the movable carrier for moving said rip saw along its ripping course upon movement of said carrier.

19. A machine of the character described including a reciprocable carrier for assembling stock, an assembly table to receive said stock after assembly, means for projecting the assembled stock across said table, a rip saw mechanism mounted on said assembly table, means engageable by the assembled stock as it is being projected across said assembly table for moving said saw to ripping position, means operated by the reciprocable carrier for moving said rip saw along its ripping course when said carrier moves in one direction and means for moving the saw from ripping position at the end of said ripping course, said means operated by the reciprocable carrier then returning said saw along said course to initial position when the carrier moves in an opposite direction.

Des Moines, Iowa, November 26, 1930.

SERN MADSEN.